United States Patent
Gilgen et al.

(10) Patent No.: US 8,230,447 B2
(45) Date of Patent: *Jul. 24, 2012

(54) ENHANCED STAGED EVENT-DRIVEN ARCHITECTURE

(75) Inventors: David Blair Gilgen, Raleigh, NC (US); Thomas Owings Rowe, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/256,092

(22) Filed: Oct. 22, 2008

(65) Prior Publication Data

US 2009/0044193 A1 Feb. 12, 2009

Related U.S. Application Data

(62) Division of application No. 10/404,334, filed on Apr. 1, 2003, now Pat. No. 7,467,390.

(51) Int. Cl.
*G06F 9/46* (2006.01)
(52) U.S. Cl. .......................... 719/318; 718/104
(58) Field of Classification Search .................. 718/102; 719/318
See application file for complete search history.

(56) References Cited

U.S. PATENT DOCUMENTS

2004/0139434 A1* 7/2004 Blythe et al. .................. 718/100

OTHER PUBLICATIONS

Welsh "SEDA: An Architecture for Well-Conditioned, Scalable Internet Services" University of Cal. Berkeley Feb. 2002 pp. 1-14.*
Smith "Probabilistic Noninterference through Weak Probabilistic Bisimulation" Florida International University 2003 pp. 1-11.*

* cited by examiner

*Primary Examiner* — Charles E Anya
(74) *Attorney, Agent, or Firm* — Steven M. Greenberg, Esq.; Carey, Rodriguez, Greenberg & O'Keefe

(57) ABSTRACT

The present invention is an enhanced staged event-driven architecture (SEDA) stage. The enhanced SEDA stage can include an event queue configured to enqueue a plurality of events, an event handler programmed to process events in the event queue, and a thread pool coupled to the event handler. A resource manager further can be coupled to the thread pool and the event queue. Moreover, the resource manager can be programmed to allocate additional threads to the thread pool where a number of events enqueued in the event queue exceeds a threshold value and where all threads in the thread pool are busy.

4 Claims, 2 Drawing Sheets

ENHANCED STAGED EVENT-DRIVEN ARCHITECTURE

CROSS-REFERENCE TO RELATED APPLICATIONS

This application is a Divisional of U.S. application Ser. No. 10/404,334, filed Apr. 1, 2003, entitled "ENHANCED STAGED EVENT-DRIVEN ARCHITECTURE," which is incorporated herein by reference in its entirety.

BACKGROUND OF THE INVENTION

1. Statement of the Technical Field

The present invention relates to the field of scalable distributed services, and more particularly to a staged event-driven architecture (SEDA).

2. Description of the Related Art

Scalable distributed services have become an important aspect of software design in the distributed software development field. In particular, the ability to scale a distributed application to process an enhanced load represents a significant challenge to the proliferation and popularization of distributed applications. In this regard, if the challenge is left unmet, the problem of scalability certainly will retard the growth of distributed software applications, including Internet based Web services. Accordingly, several performance optimizing technologies have been applied to the problem of distributed application scalability in order to address the foregoing challenge.

At the forefront of technological enhancements, the thread pooling concept has been applied to distributed application design so as to provide an enhanced level of concurrent processing of application tasks. Examples include the technologies disclosed in U.S. Pat. Nos. 6,427,161 B1, 6,377,939 and 5,991,792, in addition to United States Patent Application Publication Nos. US 2001/0018701 and US 2001/0005853, and *Control of Dynamic Threads Pool for Concurrent Remote Procedure Calls*, IBM Technical Disclosure Bulletin, Vol. 38, No. 05 (May 1995). In each of the foregoing publications, the number of threads available for use in a thread pool can be increased or decreased depending upon the load experienced in the application. Yet, the use of dynamically configured thread pools alone cannot overcome performance deficiencies experienced under particularly variable loads such as those experienced in an application server.

To that end, the staged event-driven architecture (SEDA) had been developed at the University of California, Berkeley to support massive concurrency demands while simplifying the construction of well-conditioned services. As documented in the seminal SEDA paper, Matt Welsh, David Culler, and Eric Brewer, *SEDA: An Architecture for Well-Conditioned Callable Internet Services*, in the Eightieth Symposium on Operating Systems Principles (SOSP-18), Chateau Lake Louise, Canada (Oct. 21-24, 2001), in SEDA, applications are configured with a series of interconnected, event-driven stages where each stage enjoys a coupling to a stage queue. Within each stage, a thread pool can be allocated to support processing within the stage. Through this unique combination of queued, event-driven stages and thread pools, services can be well-conditioned to load, preventing resources from being over-committed when demand exceeds service capacity.

In this regard, the SEDA design makes use of a set of dynamic resource controllers to keep stages within their specified operating range despite large fluctuations in load. More specifically, each resource controller can monitor the load experienced by an associated stage. When it is determined that the load has increased beyond a threshold level, the thread pool can be augmented. Conversely, when it is determined that the load has decreased, the number of threads in the thread pool can be reduced. Similarly, in respect to the batching of events in the event handler of the stage, the number of events processed by each iteration of the event handler can be adjusted based upon measured processing throughput.

As a result of the SEDA design, several prototypes have been assembled, including the Sandstorm™ application server which, though coded in the Java programming language, demonstrates performance which rivals that of C and C++ based application servers. Other prototype applications include the SSL and TLS protocol library, known in the art as "aTLS", a Gnutella™ packet router, and Arashi™, a Web-based e-mail service similar to Yahoo!™ Mail. Finally, the Haboob™ high-performance Web server also incorporates a SEDA design which, in consequence of such design, outperforms both the Apache™ and Flash™ Web servers.

SUMMARY OF THE INVENTION

The present invention is an enhanced SEDA stage. The enhanced SEDA stage can include an event queue configured to enqueue a plurality of events, an event handler programmed to process events in the event queue, and a thread pool coupled to the event handler. A resource manager further can be coupled to the thread pool and the event queue. Moreover, the resource manager can be programmed to allocate additional threads to the thread pool where a number of events enqueued in the event queue exceeds a threshold value and where all threads in the thread pool are busy.

In one preferred aspect of the present invention, the thread pool can be a logical thread pool coupled to a global thread pool. In another preferred aspect of the invention, the SEDA stage can be configured to have no threads in the thread pool-particularly where the underlying function of the SEDA stage is considered trivial. To that end, the SEDA stage can include a callable event handler in which a maximum and minimum number of threads in the thread pool is set to zero. Finally, it is to be noted that the event handler of the SEDA stage can be incorporated as part of an application server or a Web server.

A method for managing a thread pool in a SEDA stage can include monitoring both a number of events in a coupled event queue, and a level of busyness of threads in a coupled thread pool. At least one additional thread can be added to the coupled thread pool only when the number of events in the coupled event queue exceeds a threshold value, and when the busyness of the threads in the thread pool exceeds a threshold value. In particular, in a preferred embodiment, at least one additional thread can be added to the coupled thread pool only when the number of events in the coupled event queue exceeds a threshold value, and when the all threads in the thread pool are busy.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an enhanced SEDA stage. The enhanced SEDA stage can be configured to manage a logical thread pool in which new threads are added to the pool only when a number of queue events in an associated stage queue exceeds a threshold value, and when already allocated threads in the logical thread pool are busy. Notably, unlike a conventional SEDA implementation, the thread pool managed in the SEDA stage need not include threads runnables which are exclusive to the SEDA stage. Rather, the thread runnables can be exclusive to a global thread pool which can be shared among multiple SEDA stages. Finally, the SEDA stage need not include a thread pool at all. Rather, the SEDA stage can be configured as a directly callable stage, particularly to accommodate more trivial application functions.

Figure 1:
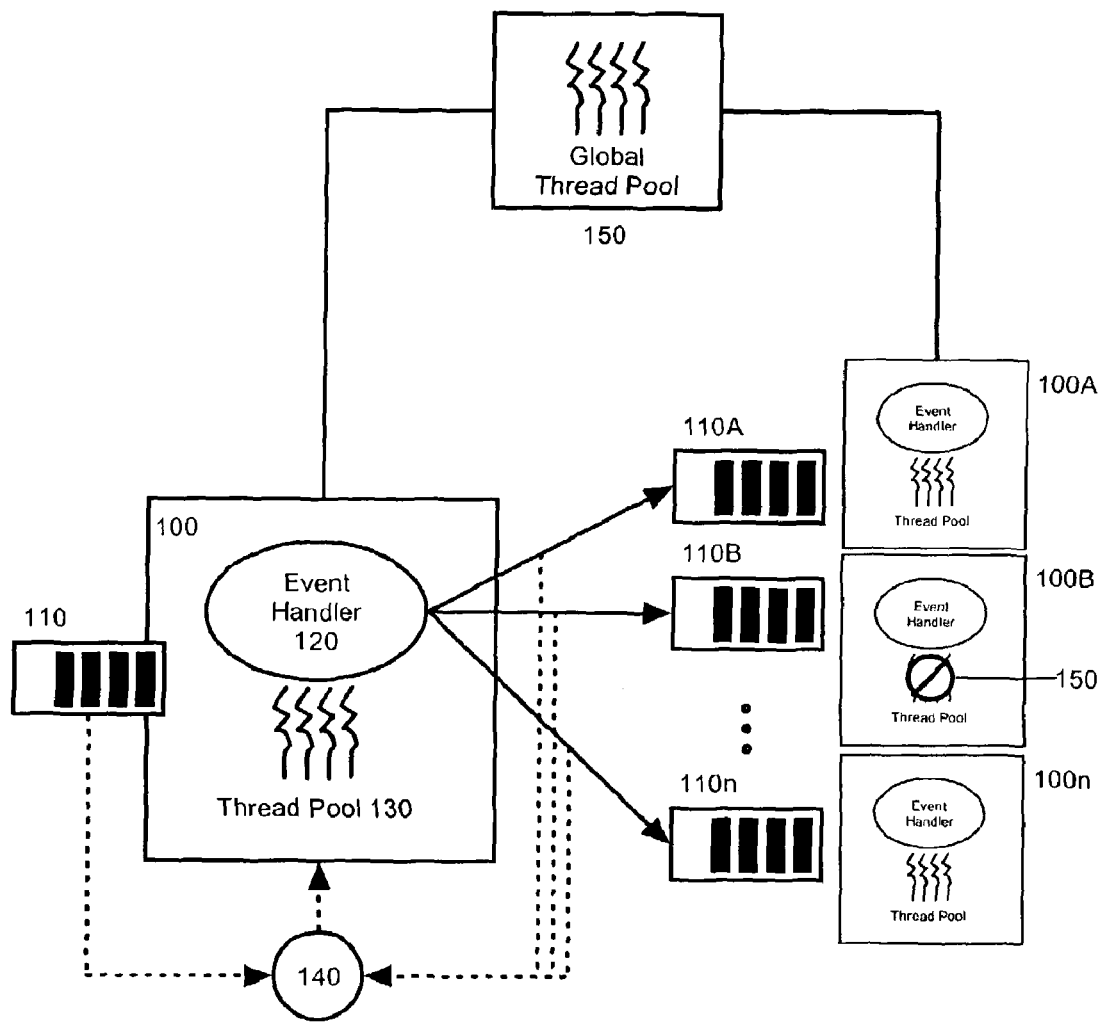
FIG. 1 is a schematic illustration of a SEDA stage which has been configured in accordance with several aspects of the present invention; and, FIG. 2 is a flow chart illustrating a process for managing a logical thread pool in the SEDA stage of FIG. 1.

FIG. 1 is a schematic illustration of a SEDA stage which has been configured in accordance with several aspects of the present invention. The SEDA stage 100 can include an event queue 110 in which incoming events can be enqueued pending processing in the SEDA stage 100. The SEDA stage 100 further can include an event handler 120 configured to process one or more computing events. Notably, the event handler 120 can be provided by the application which conforms to the SEDA design. The SEDA stage 110 yet further can include a thread pool 130 of runnable threads. In this regard, the runnable threads can be allocated to handle the processing of events in the event handler 120.

Importantly, whereas in a conventional SEDA implementation each event-driven stage can be coupled to a unique thread pool, in accordance with one aspect of the inventive arrangements, the SEDA stage 100 can be coupled to a global thread pool 150 which can provide the underlying runnable threads to one or more other SEDA stages, e.g. the SEDA stage 100A illustrated in FIG. 1. In this way, each SEDA stage 100, 100A coupled to the global thread pool 150 can maintain a logical thread pool which appears as an exclusive pool of runnable threads, albeit each runnable thread in the logical pool actually can be a thread in the global thread pool 150. Consequently, enormous overhead reductions can be experienced in the SEDA conforming application.

Like a conventional SEDA implementation, the SEDA stage 100 can be coupled to a resource manager 140. As in a conventional SEDA implementation, the resource manager 140 can monitor the number of events enqueued in an associated event queue. When the number of enqueued events in the event queue 110 exceeds a threshold value, an additional thread can be added to the thread pool 130. Additionally, the resource manager 140 can monitor the batching ratio of the event handler 120 as events are processed and passed to other event queues 110A, 110B, 110C or other SEDA stages 100A, 100B, 100C. As the batching ratio exceeds a threshold value, the number of events processed concurrently during a single iteration of the event handler 120 can be modified.

Figure 2:
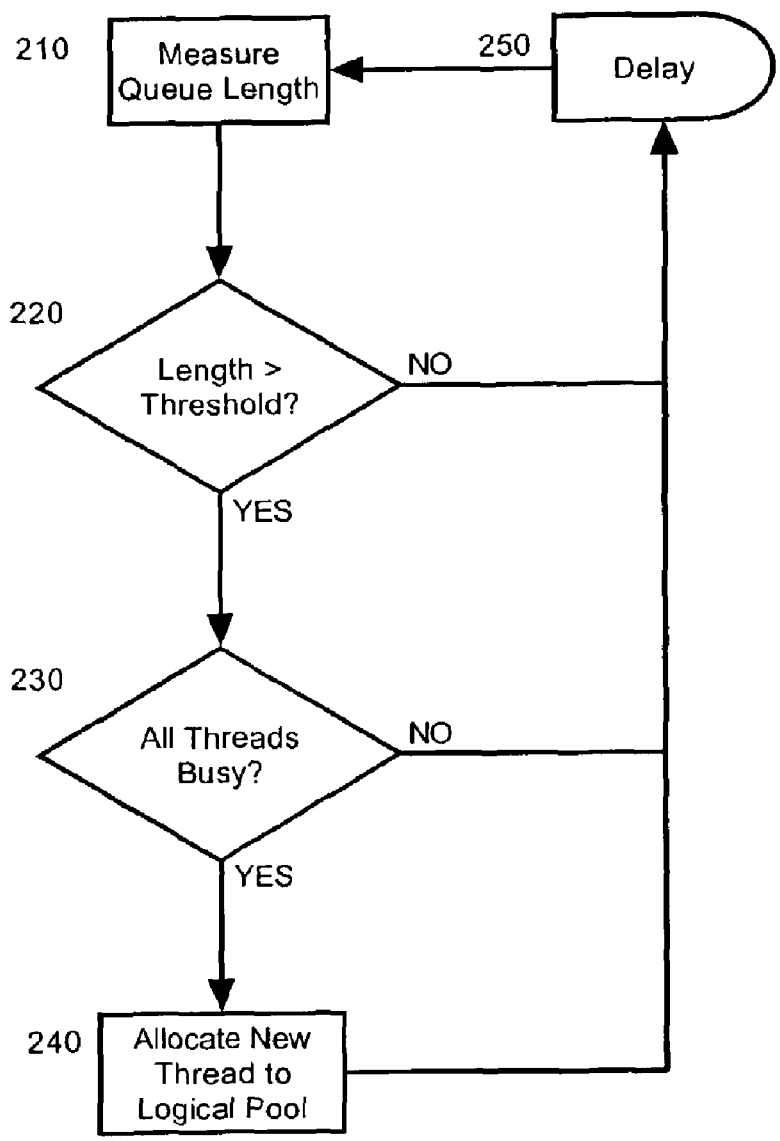

Significantly, in accordance with the present invention, and unlike a conventional SEDA implementation, upon detecting an excessive number of events enqueued in the event queue 110, the resource manager 140 of the SEDA stage 100 can add an additional thread to the thread pool 130 only if all threads in the thread pool 130 are considered "busy". In this regard, FIG. 2 is a flow chart illustrating a process for managing a logical thread pool in the SEDA stage of FIG. 1. Beginning in block 210, the number of enqueued events can be measured. If so, in decision block 220, if the number of enqueued events exceeds a threshold value, it further can be determined in decision block 230 whether all threads are busy.

In block 240, only if all threads are busy can a new thread be allocated to the thread pool. Otherwise, in block 250 a delay can be incurred before repeating the process. In this way, although the number of enqueued events can exceed a threshold, adding a new thread in the face of otherwise idle threads can result in performance degradation. Consequently, through the conditional addition of a thread as in the present invention, an order of magnitude performance advantage can be realized over the conventional SEDA design.

Importantly, in a conventional SEDA implementation, all SEDA stages include a thread pool having at least one thread available for use by the event handler 120. Thus, in a conventional SEDA implementation, all SEDA stages are "threaded", regardless of the triviality of the underlying function assigned to the SEDA stage. In the present invention, however, not all SEDA stages need be threaded. Rather, any SEDA stage, such as the SEDA stage 100B in FIG. 1 can be a callable event stage having no threads. In this regard, the maximum and minimum threads assigned to the SEDA stage 100B can be set to zero. By making the number of threads assigned to the thread pool 150 of the callable SEDA stage 100B configurable, the SEDA stage 100B can be defined as callable either during development or at deployment.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods. The "computer program product" is stored in a machine readable media. The machine readable media includes machine readable storage or transitory media. The machine readable storage comprise disk, tape, DRAM, ROM or the like. The transitory media comprise propagation medium, carrier wave or signals.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer hardware system implementing an enhanced staged event-driven architecture (SEDA) comprising:

at least one hardware processor implementing
a global thread pool; and a plurality of event-driven stages coupled to the global thread pool, each stage including
an event queue configured to enqueue a plurality of events;
an event handler programmed to process events in said event queue;
a logical thread pool coupled to said event handler; and,
a resource manager coupled to said logical thread pool and said event queue and programmed to
measure a number of events enqueued in said event queue,
determine whether all threads in said thread pool are busy,
allocate additional threads from the global thread pool to said logical thread pool where the number of events enqueued in said event queue exceeds a threshold value and where all threads in said thread pool are busy, and
delay repeating the measurement of the number of events enqueued in said event queue until all threads are busy, wherein
the plurality of event-driven stages include a callable stage in which a maximum and minimum number of threads in said logical thread pool is set to zero.

2. The computer hardware system of claim 1, wherein said event handler is incorporated as part of an application server.

3. The computer hardware system of claim 1, wherein said event handler is incorporated as part of a Web server.

4. A machine readable storage medium having stored thereon a computer program product including a computer program for implementing an enhanced staged event-driven architecture (SEDA), the computer program comprising a routine set of instructions for causing the machine to perform the steps of:
implementing a global thread pool and a plurality of event-driven stages coupled to the global thread pool, each stage including;
an event queue configured to enqueue a plurality of events,
an event handler programmed to process events in the event queue,
a logical thread pool coupled to the event handler, and
a resource manager coupled to the logical thread pool and the event queue;
monitoring, by the resource manager, both a number of events in the event queue, and a level of busyness of threads in the logical thread pool;
adding, by the resource manager, at least one additional thread from the global thread pool to said logical thread pool only when said number of events in said event queue exceeds a threshold value, and when said level of busyness of each thread in said logical thread pool exceeds a threshold value; and
delaying the measurement of the number of events in the event queue until said level of busyness of each thread in said logical thread pool exceeds a threshold value wherein the plurality of event-driven stages include a callable stage in which a maximum and minimum number of threads in said logical thread pool is set to zero.

* * * * *